US009286710B2

(12) United States Patent
Murphy-Chutorian et al.

(10) Patent No.: US 9,286,710 B2
(45) Date of Patent: Mar. 15, 2016

(54) GENERATING PHOTO ANIMATIONS

(71) Applicant: Google Inc., Mountain View, CA (US)

(72) Inventors: Erik Murphy-Chutorian, Palo Alto, CA (US); Josh Wills, Manhattan Beach, CA (US); Nicholas Butko, Mountain View, CA (US); Matthew Steiner, Los Altos, CA (US); Vivek Kwatra, Santa Clara, CA (US); Dave Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 301 days.

(21) Appl. No.: 13/894,198

(22) Filed: May 14, 2013

(65) Prior Publication Data

US 2014/0340409 A1 Nov. 20, 2014

(51) Int. Cl.
*G06T 13/80* (2011.01)
*G06T 7/00* (2006.01)

(52) U.S. Cl.
CPC .............. *G06T 13/80* (2013.01); *G06T 7/0022* (2013.01)

(58) Field of Classification Search
None
See application file for complete search history.

(56) References Cited

U.S. PATENT DOCUMENTS

| 7,636,089 B2 | 12/2009 | Anthony et al. | |
| 2004/0102226 A1 | 5/2004 | Miwa | |
| 2011/0249953 A1 | 10/2011 | Suri | |
| 2011/0304532 A1* | 12/2011 | Suh et al. | 345/156 |
| 2012/0280995 A1 | 11/2012 | Anderson | |
| 2013/0079911 A1 | 3/2013 | Dong | |
| 2013/0163953 A1* | 6/2013 | Peacock | 386/231 |

FOREIGN PATENT DOCUMENTS

| WO | 2005010725 | 2/2005 |
| WO | 2009156905 | 12/2009 |

OTHER PUBLICATIONS

Rui Cai et al.; "Automated Music Video Generation Using Web Image Resource"; 2007 IEEE International Conference on Acoustics, Speech, and Signal Processing; Apr. 15-20, 2007; Honolulu, HI, IEEE, Piscataway, NJ, US; pp. II-737.

Jun Li et al.; "Automatic Summarization for Personal Digital Photos", Information, Communications and Signal Processing, 2003 and Fourth Pacific Rim Conference on Mulitmedia; Proceedings of the 2003 Joint Conference of the Fourth International Conference in Singapore; Dec. 15-18, 20003; Piscataway, NJ, US, IEEE vol. 3 Dec. 15, 2003; pp. 1536-1540.

Sawant N. et al.; "Color Harmonization for Vidoes", Computer Vision, Graphics and Image Processing 2008; ICVIP '08, Sixth Indian Conference on IEEE, Piscataay, NJ, US; Dec. 16, 2008; 16 pages.

European Patent Office; International Search Report PCT/US2014/037793; dated Aug. 15, 2014; 5 Pages.

* cited by examiner

*Primary Examiner* — Zhengxi Liu
(74) *Attorney, Agent, or Firm* — IP Spring

(57) ABSTRACT

Implementations generally relate to generating photo animations. In some implementations, a method includes receives a plurality of photos from a user. The method also includes selecting photos from the plurality of photos that meet one or more predetermined similarity criteria. The method also includes generating an animation using the selected photos.

20 Claims, 4 Drawing Sheets

302

304

306

308

GENERATING PHOTO ANIMATIONS

BACKGROUND

Social network systems often enable users to upload photos and create photo albums. Social network systems also enable users to share photos with each other. For example, users can share photos with friends and family, which provides enjoyable and bonding experiences among users of social network systems. A user can create a photo album that is associated with the user's profile. As owner of the photo album, the user can then allow other users to view the photo album when visiting the photos section of the user's profile.

SUMMARY

Implementations generally relate to generating photo animations. In some implementations, a method includes receiving a plurality of photos from a user. The method also includes selecting photos from the plurality of photos that meet one or more predetermined similarity criteria. The method also includes generating an animation using the selected photos.

With further regard to the method, in some implementations, the predetermined similarity criteria includes a determination of similar content in the photos. In some implementations, the predetermined similarity criteria includes a determination that the photos were captured within a predetermined time period. In some implementations, the method also includes preprocessing the selected photos. In some implementations, the method also includes preprocessing the selected photos, where the preprocessing includes normalizing the photos. In some implementations, the method also includes preprocessing the selected photos, where the preprocessing includes stabilizing the photos. In some implementations, the method the generating of the animation includes determining a frame rate for the animation. In some implementations, the generating of the animation includes including a looping function in the animation. In some implementations, the method also includes notifying the user of the animation.

In some implementations, a method includes receiving a plurality of photos from a user. The method also includes selecting photos from the plurality of photos that meet one or more predetermined similarity criteria. The method also includes preprocessing the selected photos, where the preprocessing includes one or more of normalizing the photos and stabilizing the photos. The method also includes generating an animation using the selected photos, where the generating of the animation includes determining a frame rate for the animation.

With further regard to the method, in some implementations, the predetermined similarity criteria includes a determination of similar content in the photos. In some implementations, the predetermined similarity criteria includes a determination that the photos were captured within a predetermined time period. In some implementations, the generating of the animation includes including a looping function in the animation. In some implementations, the method also includes notifying the user of the animation.

In some implementations, a system includes one or more processors, and logic encoded in one or more tangible media for execution by the one or more processors. When executed, the logic is operable to perform operations including: receiving a plurality of photos from a user; selecting photos from the plurality of photos that meet one or more predetermined similarity criteria; and generating an animation using the selected photos.

With further regard to the system, in some implementations, the predetermined similarity criteria includes a determination of similar content in the photos. In some implementations, the predetermined similarity criteria includes a determination that the photos were captured within a predetermined time period. In some implementations, the logic when executed is further operable to perform operations including preprocessing the selected photos. In some implementations, the logic when executed is further operable to perform operations including preprocessing the selected photos, where the preprocessing includes normalizing the photos. In some implementations, the logic when executed is further operable to perform operations including preprocessing the selected photos, where the preprocessing includes stabilizing the photos.

DETAILED DESCRIPTION

Implementations described herein generate photo animations for users in a social network system. As described in more detail below, in various implementations, a system receives a plurality of photos from a user. The system then selects photos from the plurality of photos that meet one or more similarity criteria. In some implementations, the system preprocesses the selected photos, where the preprocessing includes one or more of normalizing the photos (e.g., adjusting image contrast) and stabilizing the photos (e.g., reducing a perceived shakiness in the motion). The system then generates an animation using the selected photos, where the generating includes determining a frame rate for the animation. In some implementations, the similarity criteria may include a determination of similar content in the photos. In some implementations, the similarity criteria may include a determination that the photos were captured within a predetermined time period. In some implementations, to generate the animation, the system may include a looping function in the animation. In some implementations, the system notifies the user of the animation.

Figure 1:
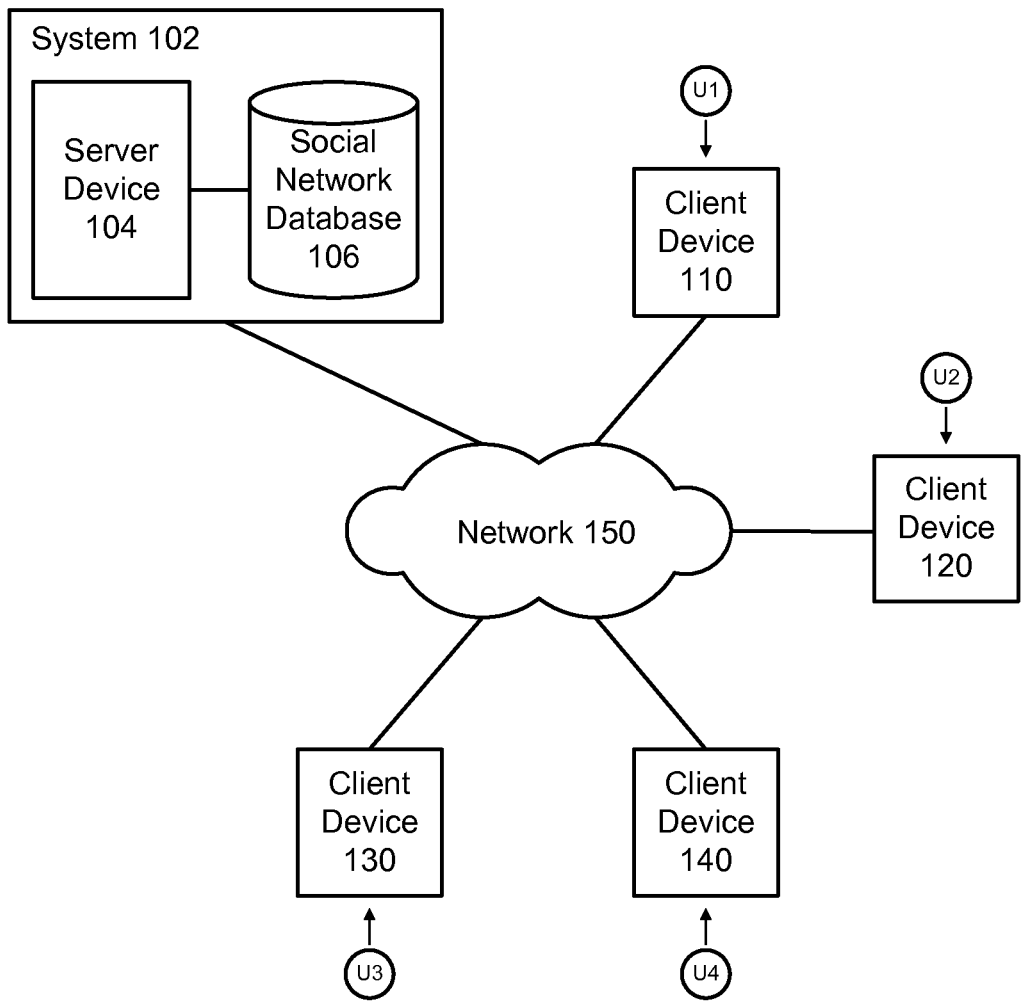
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit media content (e.g., messages, photos, photo animations, videos, etc.) to each other.

Figure 2:
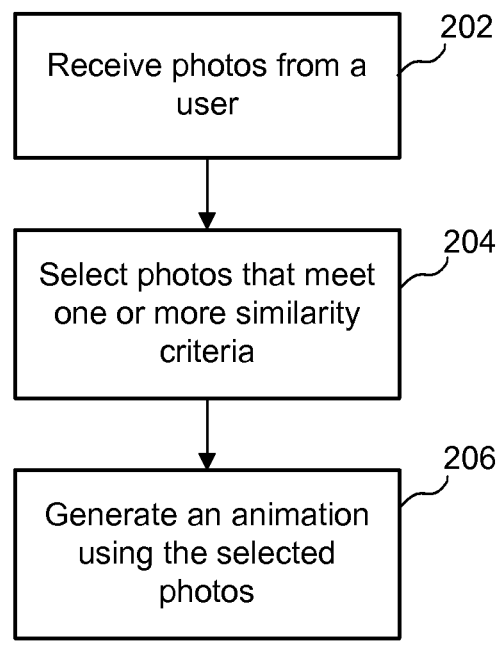
FIG. 2 illustrates an example simplified flow diagram for generating photo animations, according to some implementations.
Figure 3A:
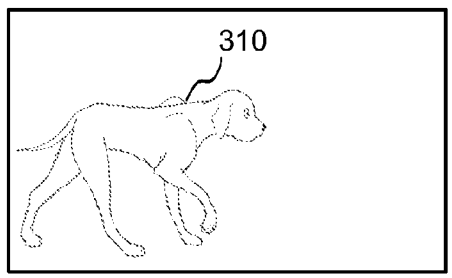
FIGS. 3A, 3B, 3C, and 3D illustrate example photos, according to some implementations.
Figure 3B:
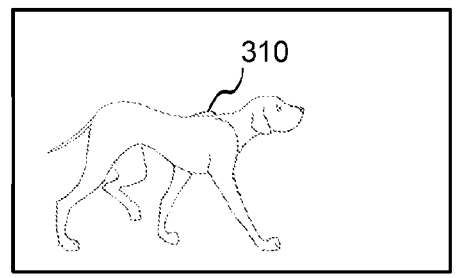
Figure 3C:
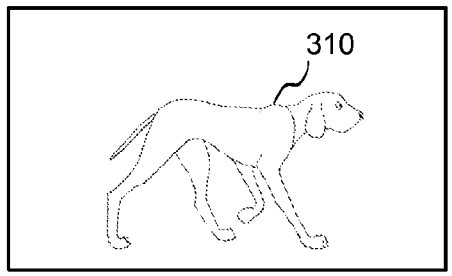
Figure 3D:
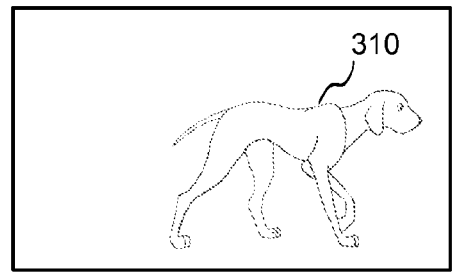

FIG. 2 illustrates an example simplified flow diagram for generating photo animations, according to some implementations. In various implementations, system 102 automatically generates photo animations with minimal or no user knowledge or skills. Referring to both FIGS. 1 and 2, a method is initiated in block 202, where system 102 receives photos from a user. In various implementations, the photos may be received when the user uploads the photos to system 102 or after the user adds the photos to one or more photo albums. In some implementations, system 102 may enable a camera device (e.g., dedicated camera, smart phone, tablet, or computer with a camera, etc.) of the user to automatically upload photos to system 102 as the camera device captures photos.

In block 204, system 102 selects photos from the group of photos that meet one or more predetermined similarity criteria. Example similarity criteria are described in more detail below in connection with FIGS. 3A, 3B, 3C, and 3D.

FIGS. 3A, 3B, 3C, and 3D illustrate example photos 302, 304, 306, and 308, according to some implementations. As shown, photos 302, 304, 306, and 308 show a dog 310.

With regard to predetermined similarity criteria, photos 302, 304, 306, and 308 illustrate an example set of photos that meet multiple predetermined similarity criteria. The following examples include various similarity criteria. The predetermined similarity criteria may vary, depending on the specific implementations.

In some implementations, the predetermined similarity criteria may include a determination that the content in the photos is the same. For example, system 102 may determine that photos 302, 304, 306, and 308 show the same content (e.g., dog 310).

In some implementations, the predetermined similarity criteria may include a determination that the content in the photos is visually similar. For example, system 102 may determine that photos 302, 304, 306, and 308 show visually similar content in that they show the same object (e.g., dog 310).

In some implementations, the predetermined similarity criteria may include a determination that the photos have a predetermined minimum degree of differences. For example, system 102 may determine that photos 302, 304, 306, and 308 show a minimum degree of differences in that they show the same object (e.g., dog 310), where the differences are positions of the object within the frames, and the positions of the legs within the frames. In some implementations, system 102 may drop frames from within a sequence of selected frames, where the dropped frames are dissimilar or visually discontinuous with the other frames within the sequence.

In some implementations, predetermined similarity criteria may include a determination of similar content in the photos. For example, system 102 may determine that photos 302, 304, 306, and 308 show similar content in that they show a pet (e.g., dog 310).

In some implementations, the predetermined similarity criteria may include a determination that the photos were taken in temporal succession (e.g., contiguously). For example, system 102 may determine that photos 302, 304, 306, and 308 where taken in temporal succession based on the timestamps of the photos.

In some implementations, the predetermined similarity criteria may include a determination that the photos were captured within a predetermined time period (e.g., within 1 minute, within M minutes, etc.). For example, system 102 may determine that photos 302, 304, 306, and 308 where taken within a predetermined time period (e.g., within 1 minute) based on the timestamps of the photos.

For ease of illustration, example photos 302, 304, 306, and 308 contain a single object. The implementations described herein also apply to other objects and to multiple objects. For example, system 102 may determine that a group of photos includes/shows the same person or the same group of people. In various implementations, system 102 may utilize a recognition algorithm to determine photos that meet one or more predetermined similarity criteria (e.g., if the content such as a person is the same in a group of photos). Example implementations of recognition algorithms are described in more detail below.

In some implementations, if a group of photos have the same content (e.g., person A), followed by one or more photos with different content (e.g., landscaping), followed by a group of photos with former content (e.g., again person A), system 102 may create two animations. For example, the first animation may be generated from the first group photos showing person A, and the second animation may be generated from the second group photos showing person A. In some implementations, system 102 may create one animation that is generated from two or more separate groups of photos showing person A.

In some implementations, system 102 may select photos from a group or burst of photos that meet a predetermined threshold number of photos. For example, system 102 may generate an animation from a burst of five or more photos. The size of the predetermined threshold number of photos used for a given animation will vary, depending on the specific implementations.

In various implementations, to ensure a high-quality animation, system 102 may preprocess the selected photos. For example, in some implementations, system 102 may normalize the selected photos. In various implementations, system 102 may normalize various image parameters (e.g., exposure, brightness, contrast, etc.) in the photos. Such normalization minimizes or eliminates any appearance of flashing or blinking in the resulting animation. In other words, without such normalization, changes in image parameters from photo to photo may cause the animation appear to flash or blink. In some implementations, system 102 may enhance photos to make the photos look better.

In some implementations, system 102 stabilizes the selected photos. For example, in some implementations, system 102 may align the features of objects within photo frames. System 102 may also determine the background motion between subsequent photos and use the results in order to apply perspective transforms to each photo, which stabilizes the animation. Such stabilizing of the photos minimizes or eliminates shakiness that may otherwise result from camera movement between frames.

In some implementations, system 102 may determine salient features in the photos (e.g., image content features) in each successive frame, determine positions of the salient features from frame to frame, and then smoothen out the path of movements of objects from frame to frame. For example, system 102 may determine the head of a person and track changes in the position of the head from frame to frame. The head position may change from frame to frame, for example, if the person is walking across a scene as photos are captured. System 102 may then smooth out the path of the head as it changes positions from frame to frame.

Referring again to FIG. 2, in block 206, system 102 generates an animation using the selected photos. In various implementations, in an animation, system 102 displays each of the selected photos in sequence one-by-one in the same portion of the display screen. For example, referring again to FIGS. 3A, 3B, 3C, and 3D, system 102 may display photos 302, 304, 306, and 308 in sequential order such that it appears that dog 310 is walking across a frame from left to right. In some implementations, system 102 may utilize photo metadata (e.g., timestamp, sub-second timestamp, etc.) to sort photos in the animation by time. In some implementations, system 102 may drop frames from within a sequence if the frames are dissimilar or visually discontinuous with the other frames within the sequence.

In various implementations, when generating an animation, system 102 may determine an animated frame rate for the animation. In various implementations, system 102 sets the animated frame rate such as a predetermined frame rate that is not too fast or slow. In some implementations, system 102 may analyze the timestamp and sub-second timestamp information in the photo metadata of each of the selected photos. System 102 may then select a frame rate that accurately reflects the capture rate of the photos. In some implementations, system 102 may select an alternative frame rate if more desirable.

For example, in various implementations, system 102 may determine if the capture rate of the photos meets a predetermined threshold (e.g., faster than 4 frames per second, etc.), system 102 may select a frame rate that is substantially equal to or similar to the capture rate. In some implementations, system 102 may determine if the capture rate of the photos does not meet a predetermined threshold (e.g., slower than 4 frames per second, etc.), system 102 may select a frame rate that is substantially equal to or similar to the predetermined threshold (e.g., 4 frames or more per second). In some implementations, system 102 may select a separate frame rate for each frame (e.g., apply a variable frame rate).

In various implementations, when generating an animation, system 102 may include a looping function in the animation. For example, in various implementations, system 102 analyzes the first frame of the animation and the last frame of the animation. System 102 then compares the first and last frames. In some implementations, if the first and last frames are similar, system 102 loops the animation with no pause between the last and first frames. In some implementations, if the first and last frames are substantially different, system 102 loops the animation with a short pause between the last and first frames. In such a scenario, adding the pause minimizes any jolting effect.

In various implementations, system 102 may generate the animation in various movie formats. For example, in various implementations, system 102 may generate the animation in an animated graphics interchange format (GIF) file, MPEG-4 (MP4) file, VP8, etc.

In some implementations, system 102 may allow for some user interaction or feedback. For example, rather than automatically generating an animation, system 102 may detect photos that would make an animation and then prompt the user to initiate generation of an animation (e.g., with a single click or selection of a button). In some implementations, system 102 may prompt the user to select the frame rate of the animation (e.g., by selecting a frame rate in a drop down menu, by dragging a slider to select a frame rate, etc.).

In some implementations, system 102 may place the animation in the user's upload stream. In some implementations, system 102 may place the animation in a photo album. In some implementations, system 102 may place the animation in a photo album that contains the original, selected photos.

In various implementations, system 102 notifies the user of the animation. In various scenarios, users take photos with no intent to generate animations, especially where users do not have the knowledge or skills to generate animations. As such, system 102 generates animations for the user and then notifies the user of each generated animation. For example, in some implementations, system 102 may send a message to the user indicating that system 102 has generated an animation and has added the animation to the user's upload stream or photo album. In various implementations, system 102 may generate and cause a visual badge to overlay an image associated with the animation. In various implementations, system 102 may generate and cause a second or combined visual badge to overlay the animation, where the visual badge indicates the type of media that it is (e.g., animation). As such, the animation may look like another still frame among many photos in a photo album, except that the animation has a badge over it.

In some implementations, system 102 may provide a message (e.g., "This animation was automatically created from the photos you took.") to the user when the user moves a pointer (e.g., mouses over) over the visual badge.

In some implementations, system 102 enables the user to play the animation by selecting (e.g., double clicking) the animation. In some implementations, when the user plays the animation, system 102 automatically adjusts the animation to a predetermined aspect ratio.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in photos. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their photos for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo. In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one more reference images with matching or similar features. In some implementations, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations automatically generate animated photo content that users can share with their friends. Such implementations require no manual effort from users, and, in particular, implementations require no user knowledge of how to create an animation. As a result, many animations may be generated and shared. Implementations described herein also increase overall engagement among users in a social networking environment.

Figure 4:
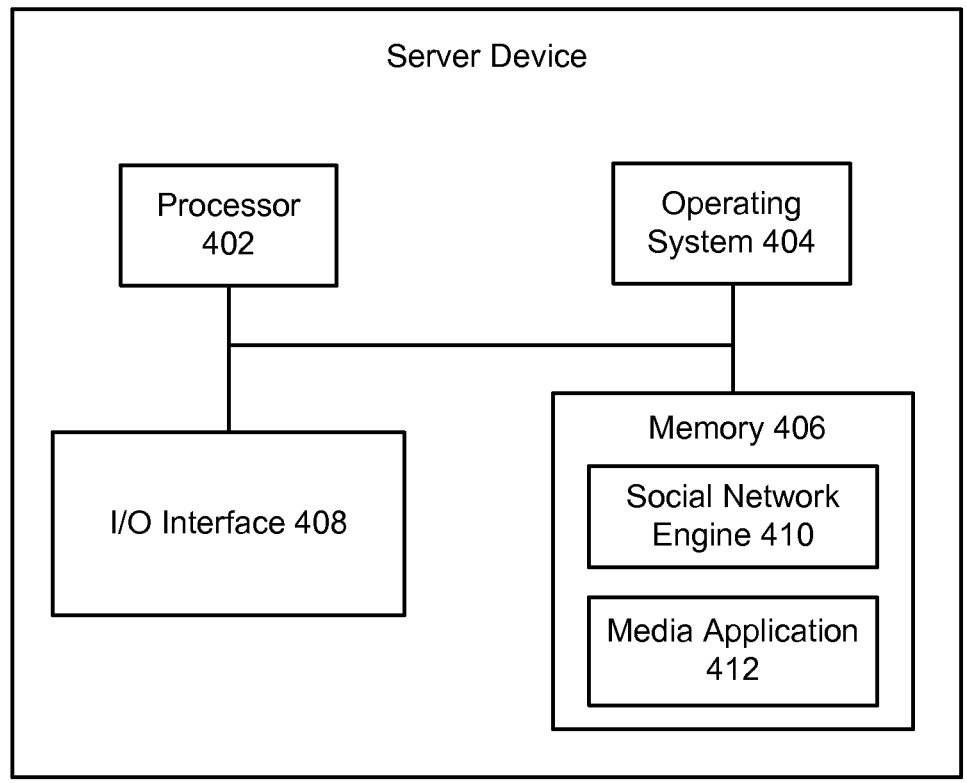
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
receiving, by a processor, a plurality of photos from a user;
selecting photos from the plurality of photos that meet one or more predetermined similarity criteria;
preprocessing the selected photos, wherein the preprocessing includes:
normalizing the selected photos by adjusting an image contrast in the selected photos; and
stabilizing the selected photos by:
determining one or more objects and a background for each of the selected photos;
determining background motion by a comparison of the one or more objects and the background for each of the selected photos with other photos of the selected photos; and
applying a perspective transform to each of the selected photos based on the background motion; and
generating an animation using the selected photos, wherein the generating of the animation comprises:
determining a frame rate for the animation; and
enabling the selected photos to be displayed sequentially in a same portion of a display screen based on the frame rate.

2. The method of claim 1, wherein the one or more predetermined similarity criteria include a determination of similar content in the selected photos.

3. The method of claim 1, wherein the one or more predetermined similarity criteria include a determination that the selected photos were captured within a predetermined time period.

4. The method of claim 1, wherein the generating of the animation comprises including a looping function in the animation.

5. The method of claim 1, further comprising notifying the user of the animation.

6. A method comprising:
receiving, by a processor, a plurality of photos from a user;
selecting photos from the plurality of photos that meet one or more predetermined similarity criteria; and
preprocessing the selected photos by normalizing the selected photos and stabilizing the selected photos, wherein stabilizing the selected photos comprises:
determining one or more objects and a background for each of the selected photos;
determining background motion by a comparison of the one or more objects and the background for each of the selected photos with other photos of the selected photos; and
applying a perspective transform to each of the selected photos based on the background motion; and
generating an animation using the selected photos, wherein the generating of the animation comprises:
determining a frame rate for the animation based on a capture rate of the selected photos; and
enabling the selected photos to be displayed sequentially in a same portion of a display screen based on the frame rate.

7. The method of claim 6, wherein the one or more predetermined similarity criteria include a determination of similar content in the selected photos.

8. The method of claim 6, wherein the one or more predetermined similarity criteria include a determination that the selected photos were captured within a predetermined time period.

9. The method of claim 6, wherein:
selecting the photos from the plurality of photos includes identifying two or more separate groups of photos that include a same object; and
the animation includes the two or more separate groups of photos that include the same object.

10. The method of claim 6, wherein normalizing the selected photos includes normalizing one or more of exposure, brightness, and contrast.

11. The method of claim 6, wherein determining the frame rate for the animation based on the capture rate of the selected photos comprises:
identifying the capture rate of the selected photos;
determining that the capture rate meets a predetermined threshold; and
selecting the frame rate for the animation based on the capture rate.

12. The method of claim 6, wherein selecting the photos from the plurality of photos includes selecting photos such that a total number of selected photos meets a predetermined threshold number of photos.

13. The method of claim 6, wherein the generating of the animation comprises including a looping function in the animation.

14. The method of claim 6, further comprising notifying the user of the animation by causing a visual badge to overlay an image associated with the animation.

15. A system comprising:
one or more processors; and
logic encoded in one or more tangible media for execution by the one or more processors and when executed operable to perform operations comprising:
receiving a plurality of photos from a user;
selecting photos from the plurality of photos that meet one or more predetermined similarity criteria;
preprocessing the selected photos, wherein the preprocessing includes:
normalizing the selected photos by adjusting an image contrast in the selected photos; and
stabilizing the selected photos by:
determining one or more objects and a background for each of the selected photos;
determining background motion by a comparison of the one or more objects and the background for each of the selected photos with other photos of the selected photos; and
applying a perspective transform to each of the selected photos based on the background motion; and
generating an animation using the selected photos, wherein the generating of the animation comprises:
determining a frame rate for the animation by:
identifying a capture rate of the selected photos;
determining that the capture rate meets a predetermined threshold; and
selecting the frame rate for the animation based on the capture rate; and
enabling the selected photos to be displayed sequentially in a same portion of a display screen based on the frame rate.

16. The system of claim 15, wherein the one or more predetermined similarity criteria include a determination of similar content in the selected photos.

17. The system of claim 15, wherein the one or more predetermined similarity criteria include a determination that the selected photos were captured within a predetermined time period.

18. The system of claim 15, wherein:
selecting the photos from the plurality of photos includes identifying two or more separate groups of photos that include a same object; and
the animation includes the two or more separate groups of photos that include the same object.

19. The system of claim 15, wherein normalizing the selected photos includes normalizing one or more of exposure, brightness, and contrast.

20. The system of claim 15, wherein stabilizing the selected photos comprises:
identifying a capture rate of the selected photos;
determining that the capture rate meets a predetermined threshold; and
selecting the frame rate for the animation based on the capture rate.

* * * * *